United States Patent [19]
Zehner et al.

[11] 4,179,681
[45] Dec. 18, 1979

[54] TARGET TRACKING SONAR SIGNAL PROCESSING AND DISPLAY SYSTEM

[75] Inventors: William J. Zehner, Lynn Haven; Henry L. Warner, Panama City, both of Fla.

[73] Assignee: The United States of America as represented by the Secretary of the Navy, Washington, D.C.

[21] Appl. No.: 339,664

[22] Filed: Mar. 5, 1973

[51] Int. Cl.² ............................ G01S 9/66; G01S 7/62
[52] U.S. Cl. .................................. 367/110; 343/5 CD
[58] Field of Search ............. 340/1 R, 3 C, 3 D, 3 R, 340/5 R; 343/5 CD, 5 DP, 7.7

[56] References Cited
U.S. PATENT DOCUMENTS

| | | | |
|---|---|---|---|
| 3,114,907 | 12/1963 | Luftman et al. | 343/7.7 |
| 3,566,408 | 2/1971 | Pedersen | 343/5 CD X |
| 3,617,997 | 11/1971 | Maass et al. | 340/3 R |

*Primary Examiner*—Richard A. Farley
*Attorney, Agent, or Firm*—Richard S. Sciascia; Don D. Doty; Harvey A. David

[57] ABSTRACT

A sonar signal processing and display system is described which converts analog return data to digital form for storage in a magnetic core memory, from which the data can be reconstituted as analog video signals for CRT display at a higher frame rate. Described are means for comparing new data to old to select updating data for the memory, and means for effecting CRT display of moving target tracks in a color distinct from stationary background returns.

12 Claims, 6 Drawing Figures

TARGET TRACKING SONAR SIGNAL PROCESSING AND DISPLAY SYSTEM

STATEMENT OF GOVERNMENT INTEREST

The invention described herein may be manufactured and used by or for the Government of the United States of America for Governmental purposes without the payment of any royalties thereon or therefor.

FIELD OF THE INVENTION

This invention relates to the processing and display of sonar signals on a CRT (cathode ray tube), and more particularly the invention is directed to the problem of enabling a sonar operator to track a slowly moving target, such as a swimmer, among various background target returns. Advantageously, the background should be displayed in one color and the target track in another color to facilitate detection and classification.

DISCUSSION OF THE PRIOR ART

Efforts have been made in the radar and sonar arts to generate a plural color CRT display which will automatically provide a semi-permanent history of the track of a slowly moving target, such as a ship in the case of radar or an intruding swimmer in the case of sonar. These efforts have generally utilized thresholding techniques on the target return signal amplitudes and a storage type cathode ray tube for storing all signals above a predetermined value. The information on the storage tube is then presented on a short persistence CRT display but at an increased frame rate to avoid flicker which has a tendency to annoy or fatigue the operator. This storage tube approach has numerous disadvantages, among the most important of which are displaying both fixed and moving targets in a like manner if they meet the amplitude criteria, and not displaying low signal level moving targets.

One example of the storage tube technique is disclosed in U.S. Pat. No. 3,114,907, issued to A. S. Luftman et al on Dec. 17, 1963. In accordance with that patent, echo return signals are stored on a storage tube and then read out at a higher frame rate for display on a CRT having both short and long persistence phosphors of differing colors. A moving target is therefore identified by a dot of one color at the head of its historical track of the other color. The historical track and background remain then of that same other color making it difficult to distinguish the track of a moving target from fixed targets or background, especially where there is overlap on the display.

In addition to those mentioned above, other disadvantages or shortcomings of the storage tube technique include the fact that resolution sensitivity, definition, and storage capacity can never be better than that of the CRT storage device used and, as a practical matter, these are limited when compared to more modern information storage devices such as magnetic core memories.

SUMMARY OF THE INVENTION

The invention accomplishes the reduction or avoidance of most of the foregoing disadvantages through the provision of a scan converting signal processing system wherein analog sonar return signals from each transmission are converted to digital form and stored in a magnetic core memory means from which signal data can then be read out at a rate which permits reiterative display a number of times within a transmission period. The use of the magnetic core memory means permits the use of short persistence phosphors which not only reduces or eliminates flicker and increases line resolution, but it also provides greatly increased ability to discern between signal amplitudes (gray levels).

The invention further contemplates such a system wherein signals received from each transmission can be compared to the stored data from previous transmissions, whereby only those portions of the old and the new data are thereafter stored which are advantageous to tracking of a moving target. As an important signal processing feature, by which the invention is distinguished from other known systems, the threshold level or signal amplitude of new data to be stored is determined as a function of the level or amplitude of previously stored data for precisely the same target or background location. Additionally, apparatus embodying the invention provides, in one of its modes of operation, a two color display wherein the entire moving target track is generated in a distinctive color as compared to the background color.

The invention may be further summarized as having as a principal object the provision of a novel moving target sonar signal processing and display system which utilizes digital storage and unique logic to improve the distinction between background and moving targets.

Another object is the provision of a sonar signal processing and display system which is characterized by its ability to generate a background display of one color on a CRT, and a historical track of a moving target in the same or a different color.

Still another object is to provide a moving target tracking system which can be used as an adjunct to a variety of existing sonar systems.

As another object the invention aims to provide a multiple color target tracking sonar signal processing system of the foregoing character having a first or normal mode of operation wherein targets and background are displayed as they are received, a second or single color tracking mode wherein the display is a historical accumulation of background and target signals, and a third or multiple color mode wherein the background accumulation is held for display in one color while a moving target generates a track in a second color. By switching momentarily from the third mode to the second and back to the third, a track of a formerly moving target which has stopped or been "lost" can be changed from the second color to the first color so that should movement of the target resume, it will be readily apparent by new generation of a second color track.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
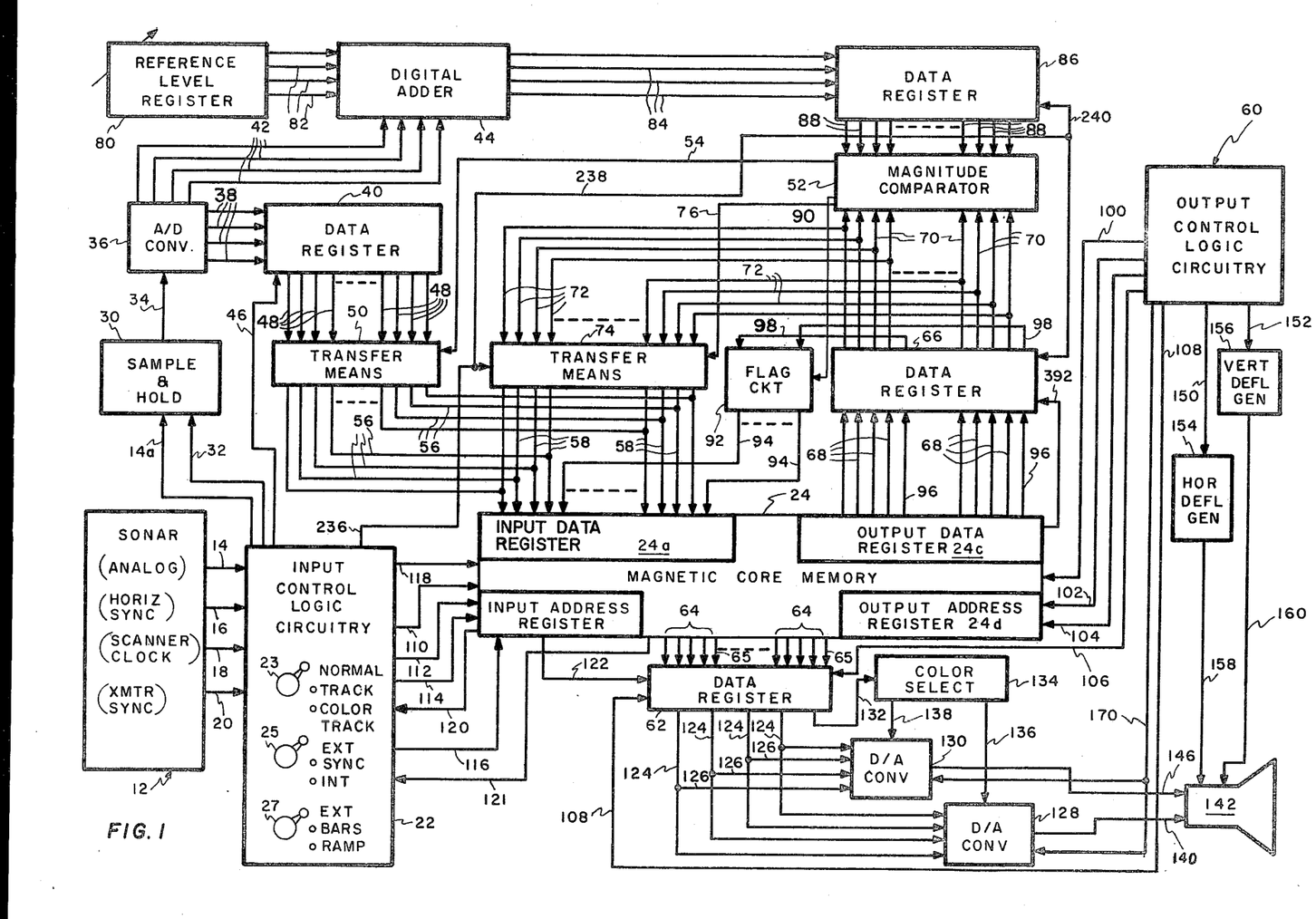
FIG. 1 is a diagrammatic illustration, in block form, of a target tracking sonar signal processing and display system embodying the invention.

Referring to FIG. 1, a signal processing and display system, indicated generally by 10 and embodying the invention, is shown in association with an existing sonar device 12 which provides a plurality of output signals including an analog voltage signal represented by line 14 and which includes return echo signals from various objects either fixed or moving. In an exemplary situation of use, sonar device 12 is a pulsed transmission, multiple beam device characterized by within pulse scanning and is typical of sonar devices used for surveillance of selected areas such as around ships or piers to detect the presence of intruding swimmers. System 10 is operable in any one of a plurality of modes. Thus, a normal operational mode may be selected in which the system serves as a scan converter for providing a flicker free display. Another mode is a target tracking mode wherein a semipermanent track is made of the path taken by a moving target, with the track being displayed in the same color as fixed or background targets. A third mode is a color track mode wherein moving target tracks are displayed in a color different from fixed or background targets.

Other output signals of sonar device 12 may include horizontal (bearing) sync signals represented by line 16, scanner clock signals represented by line 18, and transmitter sync signals represented by 20. The signals on lines 16, 18, and 20 are utilized by input control logic circuitry 22, later described in greater detail with reference to FIG. 2, to generate various control signals utilized by the system conversion of analog output signals 14 into digital word form, and to control loading of the digital word signals into a magnetic core memory means 24. The input control logic circuitry includes a mode selector switch 23 for selecting any one of the mentioned modes of operation. Also included is a selector switch 25 which permits utilization of the sonar scanning clock signals as an external source, or use of an internal clock source when the system is used with a sonar from which clock signals are not readily available. Another switch 27 provides test patterns.

Magnetic core memory means 24 may comprise any of several such means which are commercially available and have the capability of sequentially storing plural bit words or groups of words at specific addresses, and of sequentially reading out the words on command. In one practical embodiment of the invention, memory means 24 comprises a unit manufactured by Ampex Computer Products Div., of Culver City, Calif., as their model 1881 8000-word by 20 bit ferrite core memory. Memory means 24 is characterized by having an input data register 24a, an input address register 24b, an output data register 24c, and an output address register 24d.

Analog signals via line 14 from sonar device 12 are applied to a sample and hold circuit 30 via line 14a when switch 25 is in its illustrated position. Sample and hold circuit 30 is operated at a rate determined by command signals from input control logic circuitry 22, as shown by line 32. Sampled analog values are fed via line 34 to an analog to digital converter 36 which provides plural bit word data, via lines 38, to an auxilliary data register 40, and via lines 42 to a digital adder 44. In the present example, analog to digital converter 36 provides a four bit word for each analog sample. This has been found to be adequate but it will be understood that more or fewer bits could be used. Auxilliary data register 40 may comprise any number N of individual four bit word registers, only the first and last of which are indicated for purposes of clarity. In one working embodiment N has been assigned a value of four and in another, six. Register 40 is enabled by suitable control signals via line 46 from input control logic circuitry 22, which control signals are provided at a rate which is proportional to 1/N. The data stored at any given time in register 40 is made available, as indicated by lines 48, to transfer means 50 which is under the control of a magnitude comparator 52, as shown by line 54. Transfer means 50 is connected, by lines 56, 58, to provide data from register 40 to input data register 24a. As the data is put into memory means 24 via register 24a, it is assigned an address by register 24b. The data becomes available, in groups of N words, upon certain commands from output control logic circuitry 60, to an auxilliary data register 62 via lines 64, and, depending upon the selected mode of operation, to another auxilliary data register 66 via lines 68.

Data register 66 has each four bit word component connected as shown by lines 70 to magnitude comparator 52 and by lines 72 to a transfer means 74. Transfer means 74 is, in turn, connected by lines 58 to input data register 24a and, when commanded via line 76 from the comparator 52, reinserts data from register 66 into magnetic core memory 24.

The purpose of magnitude comparator 52 is to determine whether new data in register 40 shall be inserted via transfer means 50 into memory 24, or whether the older data in register 66 shall be reinserted therein. To this end, a signal rational or reference level register 80 is provided, conveniently in the form of a multiposition switch connected to a voltage source, which provides for each of its positons a four bit output signal representative of the amount by which newly received target return signal amplitude must exceed the previous return signal amplitude for which data was stored in order for the data representing the new amplitude to be stored vice the old. The four bit output signal of register 80, represented by lines 82, is applied to adder 44 where it is effectively subtracted from the output of analog to digital converter 36 and the difference applied via lines 84 to an auxilliary data register 86. Register 86 is connected as shown by lines 88 to magnitude comparator 52.

Each four bit word in register 66 which exceeds the four bit word in register 86 with which it is compared is caused by a signal on line 76 to be transferred via transfer means 74 for reinsertion into magnetic core memory 24. Each four bit word in register 86 which exceeds the four bit word in register 66 with which it is compared causes a signal on line 54 to effect transfer of its original counterpart in register 40 via transfer means 50 to magnetic core memory means 24.

Figure 4:
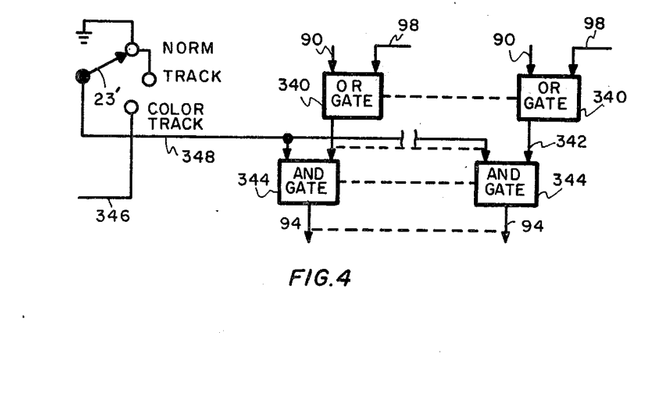
FIG. 4 is a diagrammatic illustration of the flagger circuit portion of the system of FIG. 1.

Connected to the output of magnitude comparator 52, as shown by line 90, is a flagging circuit 92, shown in more detail in FIG. 4. Flagging circuit 92 serves to generate flag bits, represented by lines 94, with one such flag bit for each four bit word which is inserted via transfer means 50 from data register 40. Flagging circuit 92 also serves to reflag via lines 94, words transferred from data register 66 which already has been stored with flag bits. Thus, presence or absence of flag bits on previously stored words is communicated from memory 24 via lines 96 to register 66, and via lines 98 from register 66 to flagging circuit 92. It should be noted at this point that presence of a flag bit with a stored word identifies the target return which that word represents as being that of a moving target in that the return exceeds previous returns for that location in the sonar scan by more than the amount set in the system by register 80.

As mentioned earlier, stored word data is made available, in N word groups, via lines 64 to an auxiliary data register 62. This is done at a rate determined by output control logic circuitry 60, and which rate is asynchronous with respect to the input rate at which words describing sonar returns are loaded into magnetic core memory 24. It should be noted at this point that words having flag bits associated with them in memory means 24 have their flag bits transferred with them via lines 65 upon transfer to data register 62. Circuitry 60, later described in more detail with reference to FIG. 3, cooperates with circuitry 22 to prevent conflicts of timing between loading and readout. Suffice it to say for the present, that suitable control signals are transmitted via lines 100, 102, and 104 to memory 24, and via lines 106, 108 to register 62. Similarly, suitable control signals are transmitted from input control logic circuitry 22 via lines 110, 112, 114, 116, and 118 to memory 24, and return signals are transmitted via lines 120 and 121, all as will be later discussed in more detail. A data ready signal is also provided via line 122 from register 24b of memory 24 to register 62.

The words in register 62 are sequentially fed via lines 124 and 126, respectively, to digital to analog converters 128 and 130. If a flag bit is present, it is communicated via line 132 to a color select circuit 134, which may conveniently be an inverter. The color select circuit serves to enable converter 128 via line 136 to provide an analog video signal via line 140 to a cathode ray tube display means 14 for display of that video signal in a first color, say red, as a moving target track.

If, however, no flag bit is present on line 132, the color select circuit enables digital to analog converter 130 via line 138 to provide an analog video signal via line 146 to display means 142 for display of that video signal in another color, say blue-white, as a fixed target or background.

Horizontal and vertical sync signals are provided via lines 150, 152 from output control logic circuitry 60 to horizontal and vertical deflection signal generators 154, 156. The outputs of those generators 154, 156 are applied via lines 158, 160 to the display means 142 to produce a desired raster, which, in the case of surveillance sonar, for example, may be in the form of a pie wedge shaped raster from which bearing and range can be read directly.

Figure 2:
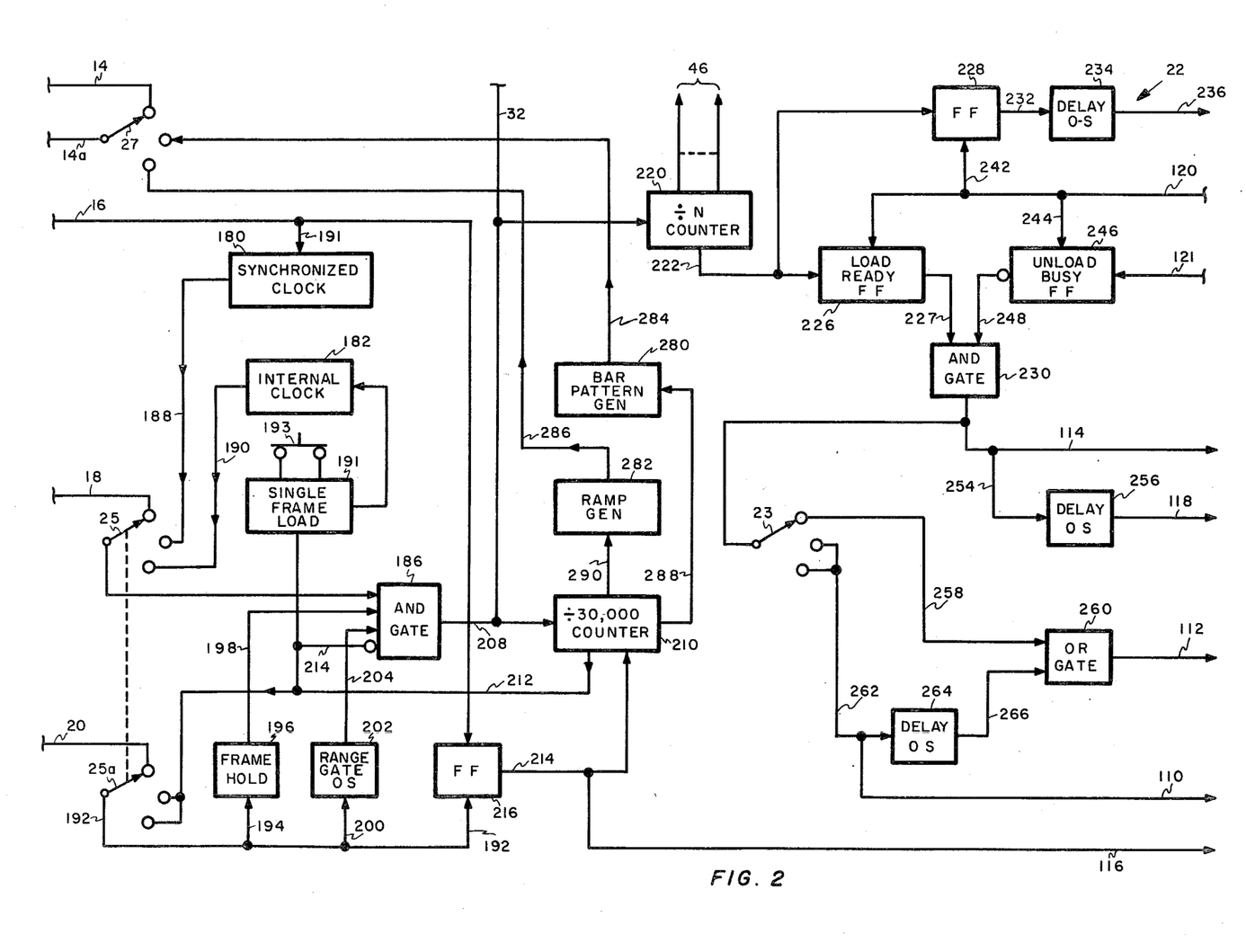
FIG. 2 is a diagrammatic illustration of the input control logic circuitry portion of the system of FIG. 1.

Referring now to FIG. 2, input control logic circuitry 22 normally operates from scanner clock, horizontal sync, and transmit signals derived from an associated sonar, such as sonar 12. However, in some circumstances it is desirable or necessary to develop those signals internally. Accordingly, there are provided a synchronized clock means 180 and an internal clock means 182. The switch 25 may be used in its illustrated position in which clock signals are derived via line 18 from sonar 12 for application via line 184 to an AND gate 186. Alternatively, switch 25 may be positioned to the contact serving line 188 from synchronized clock means 180, or to the contact serving line 190 from internal clock means 182. Synchronized clock means 180 is connected via lines 16 and 191 to derive its output from the horizontal sync signals of sonar 12. Internal clock means 182 operates wholly independently of sonar 12 to provide clock signals to AND gate 186.

When the system 10 is operated on the internal clock 182, that clock can be permitted to run continuously or, if desired, it can be inhibited by the output of a single frame load control circuit 191 except when the latter is jogged by a suitable switch 193 to permit clock 182 to provide the number of output signals required for loading a single frame of sonar data.

Other inputs to AND gate 186 are derived from sonar 12 transmitter sync signals on line 20 via switch 25a. Thus, when in its illustrated position transmit signals are fed via lines 192, 194 frame holding means 196 which is a holding circuit that holds the transmitter sync signal for a predetermined time, and line 198 to AND gate 186. The transmit signals are also fed via lines 192, 200, a range gate device 202 which is conveniently a one shot circuit, and line 204 to AND gate 186. Range gate device 202 precludes operation of the system during an initial period following transmission. Among other things, this range gate feature permits most effective use of the capacity of the magnetic core memory means 24.

The output of AND gate 186 is fed via line 208 to a dividing counter 210. In one working embodiment, this counter divides by 30,000. Counter 210 is connected via lines 212, 214 to inhibit AND gate 186 if the counter becomes full, thereby avoiding possible overloading of the memory 24. Also, when it is desired that the system be operated without external supply of transmitter sync signals, the counter output is applied through switch 25a in their stead.

Resetting of counter 210 is effected for each frame by the output on line 214 of a counter resetting flip flop 216 which is actuated by signals on line 192 and reset by horizontal sync signals on line 16. The output of flip-flop 216 is also applied via line 116 as a reset signal to address register 24b.

In addition to feeding counter 210, AND gate 186 feeds the previously mentioned sample and hold circuit 30, and also a divide by N counter 220. N, it will be recalled, is the number of digital words which can be accommodated by register 40. Accordingly, counter 220 provides enabling signals via lines 46 to register 40. Additionally, counter 220 provides inputs via lines 222, 224 to flip-flops 226 and 228, respectively. Flip-flop 226, which is dubbed the load ready flip-flop, is responsive to the output signal of counter 220 to provide a signal via line 227 to an AND gate 230 when register 40 is ready to have its data transferred if transfer means 50 becomes enabled. Flip-flop 228 is responsive to the output signal of counter 220 to apply a signal via line 232 to a one-shot device 234. One-shot device 234, after a predetermined interval, provides a reset signal via lines 236, 238 and 240 to registers 40, 66, and 86. Flip-flops 226 and 228 are adapted to be reset by an end of duty cycle signal via lines 120, 242 from memory means 24.

AND gate 230 receives, as its other input, signals via line 248 from a flip-flop 246, which is dubbed the unload busy flip-flop and is set to provide a condition or signal 247 (FIG. 6) on line 248 that disables AND gate 230 as long as data is being read out of the magnetic core memory means 24. When the memory is no longer busy unloading a group of words into register 62, an end of duty cycle signal 364 (FIGS. 5 and 6), is sent from memory means 24 via line 121 to change the state of flip-flop 246. And gate 230 is therefore enabled to send a command signal via line 114 to the input address register 24b.

Figure 5:
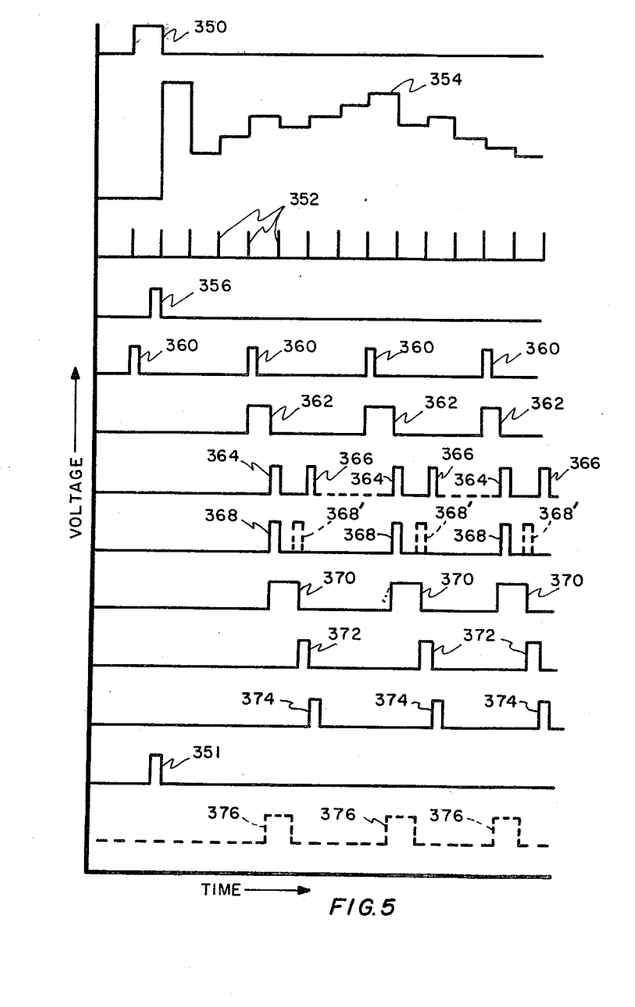
FIGS. 5 and 6 are graphically illustrated timing diagrams.

The output signal of AND gate 230 is also fed via line 254, a delay means 256, and line 118 to increment the input address register. Moreover, the output signal of AND gate 230 is fed via switch 23 and line 258 to an OR gate 260 when that switch is in the normal mode position, and via a line 262, delay means 264, and line 266 to or gate 260 when in the track or color track positions as well as via line 110 to the magnetic core memory means 24 as a read/modify/write command signal 368 (FIG. 5).

Input control logic circuitry 22 further comprises means for generating test patterns. To this end, the system includes a bar pattern generator means 280 and a ramp generator means 282. The output signals of each on lines 284 and 286, respectively, can be selectively applied to the sample and hold circuit 30 by appropriate positioning of switch 27. The generator means 280 and 282 conveniently receive timing signals from counter 210 as shown by lines 288 and 290.

Figure 3:
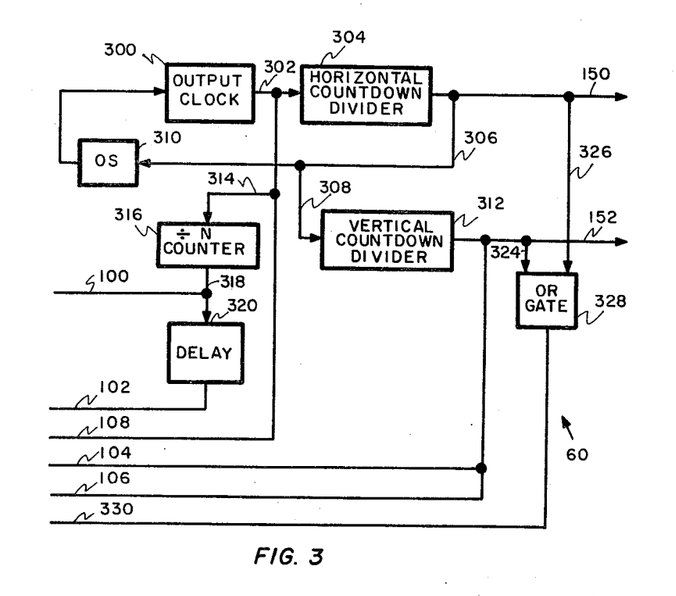
FIG. 3 is a diagrammatic illustration of the output control logic circuitry portion of the system of FIG. 1.

Referring to FIG. 3, output control logic circuitry 60 comprises a clock 300 which provides clock signals represented by line 302 at a rate or frequency which need not be related to the clock signals used by the input control logic circuitry. Rather, the frequency of the clock signal output of clock 300 is selected to provide a suitable, flicker free presentation on the display means 142. In one practical embodiment, clock 300 is operated at a frequency of ~1.5 MHz which frequency is applied via line 302 to a horizontal countdown divider 304 that provides the horizontal sync signals on line 150. The horizontal sync signals are further fed as shown by lines 306 and 308 to a one shot device 310 and to a vertical count down divider 312. One shot device 310 provides a timely reset signal to clock 300 whereas divider 312 provides the vertical sync signals on line 152. Signals from clock 300 are applied directly as shown by line 108 as shift commands to register 62. Clock 300 signals are further applied via line 314 to a divide by N counter 316, the output of which on line 100 is used as a read/restore command to memory means 24. The output of counter 316 is also applied via line 318, delay means 320, and line 102 as an output address register increment command.

The vertical sync signals are applied, as shown by lines 104 and 106 as commands to magnetic core memory means 24 for resetting of output address register 24d and for resetting data register 62. The horizontal sync signals and the vertical sync signals are fed also, as shown by lines 324, 326 to an OR gate 328, the output of which is represented by line 330, and is used to effect blanking of digital to analog converters 134, 136 during horizontal and vertical retrace on the display means 142.

Flagging circuit 92, best illustrated in FIG. 4, comprises N OR gates 340 each connected by a line 90 to receive as one input a signal corresponding to a decision by magnitude comparator 52 that a digital word in register 86 is greater than its opposite in register 66. Each OR gate 340 is adapted to receive an alternative input via line 98 and has its output connected as shown by lines 342 to provide one input to a corresponding AND gate 344. The other input to each AND gate 344 is derived from a suitable voltage source via line 346, switch 23' when in the illustrated position, and lines 348. When a coincidence of inputs occurs at an AND gate 344 it provides a flag bit via line 94 for storage with the corresponding digital word which is being stored for the first time as indicative of a moving target, or restored as part of the track of such a target. When switch 23' is moved to either of its other positions no different color track will be generated or maintained.

MODE OF OPERATION

Further understanding of the operation of system 10 can best be had by additional reference to the timing diagrams of FIGS. 5 and 6. Considering first the normal, or non-tracking, mode of operation, and with reference primarily to FIG. 5, after occurrence of a transmitter sync pulse 350 on line 20, which pulse is used to reset counter 210 and to initiate an input address register reset command 351 on line 116, analog signals from sonar 12 are sampled and held at a rate determined by clock signals 352 on line 18 to provide a sample and hold output 354 on line 34. Also, after initiation of transmitter sync signal 350, a horizontal line sync signal 356 is provided on line 16 that is used to reset flip-flop 216 and, when synchronized clock 180 is used, signal 356 provides sync for the clock. Clock signals 352 are divided by a factor N by counter 220 to provide signals 360 which serve to sequentially enable the N register sections of register 40 to store N digital words, each consisting of four bits in the system being described. Signals 360 are also used to initiate load ready signals 362 as the output of flip-flop 226. These signals, when coincident with signals from flip-flop 246 which is operated by end of duty cycle signals 364, 366 respectively on lines 120, 121 from output and input cycles of the memory means 24, cause AND gate 230 and OR gate 260 to provide clear/write cycle commands 368 on line 112. The direct output of AND gate 230 are input address register cycle commands 370 on line 114. The output of flip-flop 228 and one shot device 234 comprises reset signals 372 on line 236 to reset registers 40, 66, and 86. The output of delay 256 on line 118 comprises signals 374 which incrementally advance the input address register for each word input.

It will be recognized from the foregoing that the transmitter sync signals 350 defines the beginning of each new frame, while the horizontal line sync 356 is used to ensure that loading of information into the system commences at the time the sonar scanner begins scanning the first line following the transmitter sync signal. The clock signals 352 provide a predetermined rate of sampling the analog signal output of the scanner, one sample being taken for each of the elements in the sonar transducer array. When the entire array has been scanned, one horizontal line has been memorized by the system. The next horizontal line sync signal starts the scanning of the next line.

Analog signals from the sonar scanner output are converted into four bit digital words by analog to digital converter 36 at the scanner clock rate. Each word then defines the amplitude of the return signal for a particular location in the field of observation. As each sample is converted into a four bit word, it is stored temporarily in data register 40. After N four-bit words have been converted and entered into data register 40, divide by N counter 220 output signal 360 changes the state of load ready flip-flop 226. At the completion of the next subsequent output cycle (discussed later), end of duty cycle signal 364 on line 116 from the memory means resets the load ready flip-flop.

In the normal mode of operation being described, flip-flop 226 signal 362 initiates the clear-write command 368 from OR gate 260 and the input-address register command 370 from AND gate 230. At that time, N four-bit words are entered in parallel from register 40 into input data register 24a. It should be noted at this point that register 40 and divide by N counter 220 cooperate to reduce the number of times memory means 24 must be sent through a clear-write cycle.

At the completion of the clear-write cycle, signal 366 is applied to flip-flop 228 which causes one shot device 234 to clear data registers 40 and 86 (although the latter is not used during the normal mode of operation). Signal 374 from delay means 256 than advances the input address register, which also happens to be a binary counter, to the next position in the memory.

The foregoing input process continues until the memory is full or a new transmit sync pulse 350 occurs, at which time the memory input-address register is reset to its starting point by signal 351 and begins to load a new frame in place of the old. In the normal mode of operation, each frame of new information completely replaces the data of the preceding frame.

Data is read out from the memory means 24 at a different, higher rate determined by output logic control circuitry 60 for display using somewhat television-like scanning techniques, although a pie-wedge shaped raster is often advantageously used. The reading out process is the same whether the system 10 is operated in normal, track, or color track modes although some of the commands are superfluous in the normal mode. Accordingly, operation of data input processing during track and color track modes will be described before operation of the read-out cycle. Suffice it to say for the moment that during readout digital words for each location are temporarily sequentially placed in register 66 for use in the track and color track modes of input processing.

In the track mode of operation, selected by positioning of switches 23, 23', the input cycle is different in that the old data in the memory means 24 is compared with new data for each position in the field of observation. If the new data is larger by a predetermined amount than the old for a particular location, the new data for that location is entered into the memory means in place of the old. Otherwise the same old data is re-entered in the same memory location. The result is that targets moving through the field of "view" leave data in the memory means describing at one time all prior and current locations of these targets. When viewed on the CRT display means 42, a track of the target's progress is seen. Moreover, after background data has been established by operation for a while in the track mode, switches 23, 23' may be moved to their color track positions. Thereafter, each replacement of old data by new data is accompanied by a flag bit which identifies that data as being part of the track of a moving target. The flag bit is then retained even if that same data is reinserted in the memory means. The flag bit is utilized during readout to select operation of a color gun for displaying the track which is different from the color gun used for the background.

The aforementioned comparison of new and old data in the track or color track mode is effected by magnitude comparator 52. In the system 10 being described, reference level register 80 is a binary coded twelve position switch that can be manually adjusted to select any one of twelve possible amplitude thresholds. The register 80 switch therefore provides a criterion that is selected by the operator and, as mentioned earlier, the output of register 80 is in digital word form. If the digital word equivalent of new data is less than the digital output of register 80, an effective zero is stored for that word by register 86 since it was cleared by the end of cycle command from the previous input cycle. If the new data amplitude exceeds the reference level selected at register 80, the amount by which it so exceeds is stored digitally in register 86. That is, the new return signal data minus the reference level is placed in register 86. Previously stored data for the same location in the field of observation is at that time placed in register 66 and is immediately compared word for word with the value in register 86. If any data words in register 66 are larger, they are reinserted as input to memory means 24 by way of transfer means 74. If any data in register 86 is larger, its source data in register 40 is substituted in the memory means for the previously stored data by way of transfer means 50. When operating in the color track mode, insertion of the new data would be accompanied by a flag bit as previously explained.

In carrying out the foregoing, the command signals derived from logic circuitry 22 are modified. Thus, in both the track and color track modes, switch 23 directs a portion of the output signal of AND gate 230 to line 110 as read/modify/write cycle command signal 376 shown in FIG. 5 in dotted lines. The AND gate output is also supplied to delay means 264 which feeds OR gate 260 to produce a delayed version of the clear/write cycle command 368 on line 112. This delayed version, shown in dotted lines in FIG. 5, occurs instead of the earlier version shown in full lines.

The flagging circuit, controlled by switch 23, operates only in the color track mode, as is evident from FIG. 4. In that mode, whenever new data is to be entered after comparison, or whenever old data already having a flag bit is to be re-entered, the appropriate AND gates 344 are enabled to apply or reapply flag bits via lines 94.

Figure 6:
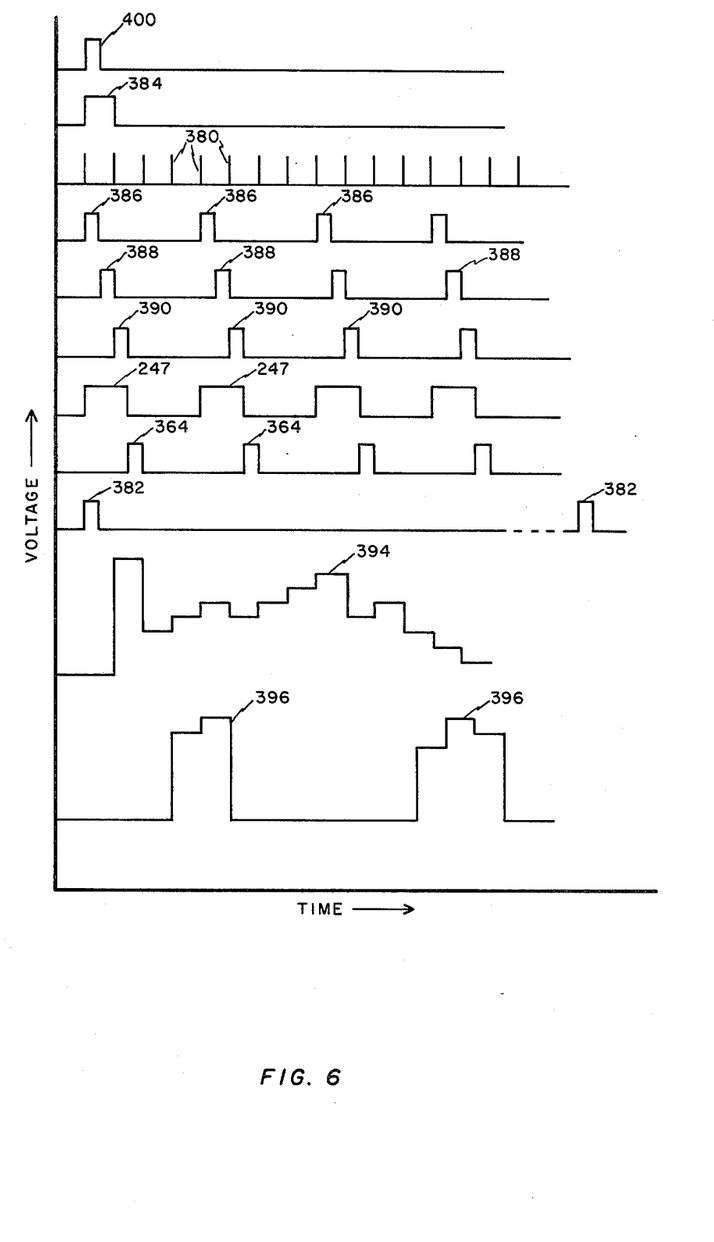

Now, directing attention to FIGS. 3 and 6 for consideration of the operation of circuitry 60 during readout, unload clock 300 provides clock signals 380 on line 302, which signals are counted down by divider 304 to provide horizontal sync signals 382, and by divider 312 to provide vertical sync signals 384. The clock signals are also counted down by counter 316 by factor N to provide read/restore cycle signals 386 on line 100 to memory means 24. The output of counter 316 is also applied to delay means 320 to provide increment command signals 388 on line 102 to the output address register 24d. Immediately following the signals 388, data ready signals 390 are provided from output data register 24c to register 66 via line 392.

At the start of an unload or readout cycle, a read/restore command 386 is given via line 100 to the output address register of memory means 24. In response thereto, to memory means causes N four bits words to be transferred in parallel via lines 64 to data register 62. The presence or absence of a flag bit for each of the N words is also transferred via lines 65. The N words are shifted out of register 62 serially, via lines 124, 126 into digital to analog converters 128, 130 by output clock signals 352 on line 108. After N shifts, divide by N counter 316 provides another read/restore command 386 to the output address register of memory means 24, and N more words are entered into data register 62. At the occurrence of end of cycle signal 364, the output address register is incremented to the next memory position.

During an unload cycle, the unload busy flip-flop 246 prevents an input cycle from being implemented. This is necessary because the memory means 24 can perform only one cycle, either input or output, at one time. This method of alternative operation is termed herein as sequential interlace.

The outputs 394, 396 of digital to analog converters 128/130 are amplified and used to intensity modulate different color guns of a CRT in display means 142.

Horizontal countdown divider 304 may conveniently be manually adjustable to permit selection of the number of words per horizontal scan line in the output display. When the selected number of output clock pulses 380 have entered the horizontal countdown divider, it provides horizontal sync signal 382 on line 150 to horizontal deflection generator 154 for the display means. The output of horizontal countdown divider 304 also is used as mentioned earlier to blank digital to analog converters 128, 130 during retrace, provides one count to vertical countdown divider 312, and also inhibits clock 300, by way of one shot 310, during retrace.

After the selected number of vertical lines of readout have been accumulated, vertical countdown divider 312 provides sync signal 384 to vertical deflection generator 156, blanks digital to analog converters 128, 130 during retrace, and gives the output address register reset signal 400 via line 104 to memory means 24, which returns that output address register to the beginning of the next frame.

Keeping in mind that the readout procedures occur at a faster rate (more frequently) than the read-in procedures, each frame of sonar data is displayed a sufficient number of times to provide the desired brightness and flicker-free presentation by display means 42. Each frame of data readout, however, requires only a fraction of the available working time of the memory means 24 and, while it is characteristic of such memorys as the one actually used that read-in and read-out cannot occur simultaneously, load ready flip=flop 226, unload busy flip-flop 246, and AND gate 230 cooperate to provide sequential interlace of data read-in operations with read-out operations.

The outputs of digital to analog converters 134, 136 are, of course, representative of the updated data stored in memory means 24 of background and for moving target tracks. Such output data will be in step form as shown respectively at 394 and 396.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A sonar signal processing and display system for use with a source of analog sonar return signals, transmitter sync signals, scanner clock signals, and line sync signals, said system comprising:
   memory means for storing and reading out data in multi-bit digital word form;
   sample and hold means for periodically sampling said analog return signals;
   analog to digital converter means, connected to said sample and hold means, for converting samples of said analog return signals into digital word signals;
   first data register means, connected to said analog to digital converter means, for accumulating a predetermined number of digital words;
   transfer means, connected between said first data register means and said memory means, for effecting transfer of said digital words for storage in said memory means;
   input control logic circuit means for controlling said sample and hold means, said first data register means, said transfer means, and said memory means in response to said transmitter sync signals, said scanner clock signals, and said line sync signals to effect said converting and said storage at a predetermined sonar frame rate and at addresses in said memory means corresponding to locations in the sonar field of observation;
   second data register means, connected to said memory means, for temporarily storing said words in a one at a time sequence as they are read out of said memory means;
   digital to analog conversion means, connected to said second data register means, for converting said digital words temporarily stored therein into analog output signals;
   cathode ray tube display means connected to said digital to analog conversion means, for generating a display of said analog output signals; and
   output control logic circuit means for controlling said memory means, said second data register means, said digital to analog conversion means, and said display means so as to display said analog output signals at a display frame rate which is a multiple of said predetermined sonar frame rate.

2. A sonar signal processing and display system as defined in claim 1, and further comprising:
   a source of reference level digital words;
   digital adder means for effectively subtracting the value of digital words in said first register means from the value of said reference level digital words to produce difference level digital words;
   third data register means, connected to said adder means, for temporarily storing said difference level digital words;
   fourth data register means, connected to said memory means, for receiving from said memory means previously stored data words corresponding to analog signals from the same location in said field of observation as analog signals from which digital word data then in said first register means was derived;
   comparator means, connected to said third and fourth register means, for providing output signals characteristic of relative magnitudes of word values in said third and fourth register means; and
   transfer means, responsive to said output signals, for inserting into said memory means said digital words in said first register means when the magnitude of word values in said third register means exceeds that in said fourth register means, and for reinserting into said memory means said digital words in said fourth register means when the value of those words exceeds the value of the words in said third register means.

3. A sonar signal processing and display system as defined in claim 2, and further comprising:
   flagging circuit means, connected to said comparator means, for providing a flag bit output for insertion into said memory means with data words inserted therein from said first register means in response to said output signals from said comparator means.

4. A sonar signal processing and display system as defined in claim 3, and further comprising:

color selection circuit means, connected to said memory means, for providing first and second enabling signals in response to presence and absence, respectively, of said flag bit in association with each data word read out from said memory means.

5. A sonar signal processing and display system as defined in claim 4 and wherein:

said digital to analog conversion means comprising first and second digital to analog converters connected to receive digital word read out from said memory means;

said cathode ray tube display means comprises means for displaying analog data in first and second colors; and said first and second digital to analog converters being responsive to said first and second enabling signals.

6. A sonar signal processing and display system as defined in claim 5, and wherein:

said output control logical circuit means comprises output clock means for generating output clock signals for use in effecting read out of digital word data from said memory means at a second frame rate which is greater than said sonar frame rate.

7. A sonar signal processing and display system as defined in claim 6, and wherein said input control logic circuit means comprises means for effecting read in of digital word data into said memory means only during those times when readout of data from said memory means is not being carried on.

8. A sonar signal processing and display system as defined in claim 7 and wherein:

said first register means is adapted to sequentially receive and hold a plurality of N digital words; and said third and fourth register means and said memory means are adapted to receive said N digital words in parallel.

9. A sonar signal processing and display system as defined in claim 8, and wherein:

said input control logic circuit means comprises a first divide by N means for dividing said scanner clock signals by N for use in generating command signals for said register means and said memory means; and said output control logic circuit means comprising a second divide by N means for dividing said output clock signals by N for use in generating other command signals for said memory means.

10. A sonar signal processing and display system as defined in claim 9, and wherein said input control logic circuit means comprises:

internal clock means for providing internal clock signals in the absence of available scanner clock signals; and counter means responsive to said scanner clock signals or to said internal clock signals to provide a frame initiating pulse in the absence of said transmitter sync signal before said memory means becomes overloaded.

11. A sonar signal processing and display system as defined in claim 10, and wherein said output control logic circuit means further comprises:

countdown divider means, responsive to said output clock signals, for generating horizontal sync signals for said display means; and countdown divider means, responsive to said output clock signals, for generating vertical sync signals for said display means.

12. A signal processing and display system for use with a source of analog return signals, scanner clock signals, transmitter sync signals, and line sync signals, said system comprising:

sample and hold means for sampling said analog return signals at the rate of said scanner clock signals to provide analog signal samples;

analog to digital converter means, connected to said sample and hold means, for converting said samples to sequential, plural bit, new data digital words each defining amplitude of return from a certain location in the field of observation and in a given scanning frame, a magnetic core memory means having plural bit multiple digital word capability for storing digital data words representative of scanning one frame, said memory means comprising address register means for sequentially identifying digital data words stored in said memory means;

first multiple word register means, connected to said analog to digital converter means, for accumulating N new data digital words;

first transfer means, connected between said first multiple word register means and said memory means, for effecting parallel transfer of up to N digital words therebetween in response to a first transfer enabling signal;

a source of reference level digital words, said source being selectively adjustable;

digital adder means, connected to said source and to said first multiple word register means, for subtracting the latter from the former;

second multiple word register means, connected to said digital adder means, for temporarily storing digital words representing amounts by which said reference level digital words exceed said new data digital words;

third multiple word register means, connected to said memory means, for receiving N previously stored old data digital words derived from prior scanning frames and derived from the same locations in said field of observation from which the new data words in said first multiple word register means were derived;

second transfer means, connected between said third multiple word register means and said memory means, for effecting transfer of up to N words in parallel from said third multiple word register means to said memory means in response to second transfer enabling signals;

digital word comparator means, connected between said second and third multiple word register means, and operative to provide one of said first transfer enabling signals for each word in said second multiple word register means which exceeds the corresponding word in said third multiple word register means, and operative to provide one of said second transfer enabling signals for each word in said third multiple word register means which exceeds the corresponding word in said second multiple word register means;

flag bit generating means, connected to said comparator means, and operative to add a flag bit for storage with each new data word stored or for storage with each old data word previously stored with a flag bit;

output register means, connected to said memory means, for successively reading out each of said digital words stored therein;

first and second digital to analog converters, each connected to said output register means, said first digital to analog converter being operative to convert a first analog output signal each digital word readout of said memory means which was stored with a flag bit, and said second digital to analog converter being operative to convert to a second analog output signal each digital word read out of said memory means which was stored without a flag bit;

display means connected to said first and second digital to analog converters and responsive to said first and second analog output signals to respectively provide first and second color displays on a single cathode ray tube;

input control logic means responsive to said scanner clock signals, said transmitter sync signals, and said line sync signals to generate signals for operation of said memory means and said first and second multiple word register means; and output control logic means comprising output clock means for generating output clock signals at a rate greater than said scanner clock signals, said output control logic means being operative to provide signals for operation of said memory means, said third multiple word register means, said output register means, and said display means.

* * * * *